United States Patent
Kim et al.

(10) Patent No.: US 8,845,170 B2
(45) Date of Patent: Sep. 30, 2014

(54) LIGHT GUIDE PLATE AND BACKLIGHT UNIT HAVING SAME

(75) Inventors: Sang-Soo Kim, Seoul (KR); Jin-Sung Choi, Yongin-si (KR); Tae-Seok Jang, Seoul (KR); Sang-Hoon Lee, Cheonan-Si (KR)

(73) Assignee: Samsung Display Co., Ltd. (KR)

( * ) Notice: Subject to any disclaimer, the term of this patent is extended or adjusted under 35 U.S.C. 154(b) by 730 days.

(21) Appl. No.: 12/493,762

(22) Filed: Jun. 29, 2009

(65) Prior Publication Data

US 2010/0002466 A1    Jan. 7, 2010

(30) Foreign Application Priority Data

Jul. 3, 2008   (KR) ................ 10-2008-0064533

(51) Int. Cl.
*F21V 7/04* (2006.01)
*F21V 8/00* (2006.01)

(52) U.S. Cl.
CPC .............. *G02B 6/0068* (2013.01); *G02B 6/003* (2013.01); *G02B 6/0038* (2013.01); *G02B 6/0036* (2013.01)
USPC ......................................... 362/608; 362/621

(58) Field of Classification Search
CPC .... G02B 6/003; G02B 6/0036; G02B 6/0038; G02B 6/0068; G02B 6/0073
USPC .............. 362/97.3, 608, 610, 612, 621–622; 349/65, 69
See application file for complete search history.

(56) References Cited

U.S. PATENT DOCUMENTS

| | | | | |
|---|---|---|---|---|
| 5,027,258 | A * | 6/1991 | Schoniger et al. | 362/629 |
| 7,347,610 | B2 * | 3/2008 | Chang et al. | 362/621 |
| 7,703,973 | B2 * | 4/2010 | Zhu et al. | 362/623 |
| 2004/0141104 | A1 * | 7/2004 | Yu et al. | 349/65 |
| 2008/0094853 | A1 * | 4/2008 | Kim et al. | 362/612 |

FOREIGN PATENT DOCUMENTS

| | | |
|---|---|---|
| JP | 2005-310422 | 11/2005 |
| JP | 2007-148332 | 6/2007 |
| KR | 10-2004-0089333 | 10/2004 |
| KR | 10-2004-0102143 | 12/2004 |
| KR | 10-2005-0115717 | 12/2005 |
| KR | 10-2005-0030350 | 4/2006 |
| KR | 10-2008-0038594 | 5/2008 |

* cited by examiner

*Primary Examiner* — Jason Moon Han
(74) *Attorney, Agent, or Firm* — Innovation Counsel LLP

(57) ABSTRACT

In a light guide plate and a backlight unit, a light guide plate includes a light incident surface, an opposite surface, a top surface, a bottom surface, and a plurality of optical path changing units. The optical path changing units are aligned on at least the bottom surface of the top surface and the bottom surface at a predetermined interval while protruding in parallel to a reference line perpendicular to the light incident surface. Accordingly, power consumption used to generate the light may be reduced.

17 Claims, 9 Drawing Sheets

__(1)__

LIGHT GUIDE PLATE AND BACKLIGHT UNIT HAVING SAME

CROSS-REFERENCE TO RELATED APPLICATION

This application relies for priority upon Korean Patent Application No. 2008-64533 filed on Jul. 3, 2008, the contents of which are herein incorporated by reference in their entirety.

BACKGROUND

1. Field of Invention

The present disclosure of invention relates to a light guide plate and a backlight unit of a liquid crystal display (LCD) panel having such a guide plate. More particularly, the present disclosure relates to a side-lit (edge lit) light guide plate capable of reducing power consumption by the side lighting light source (when selective regional or local dimming is employed) and a backlight unit having the light guide plate.

2. Description of Related Technology

Since liquid crystal displays (LCDs) and other flat panel light valve types of displays are called upon to have advantages such as slimness, light weight, and low power consumption, ways to reduce flat panel display thickness and/or power consumption have been extensively explored. The typical LCD includes an LCD panel that displays an image by selective shuttering of light, a backlight unit that supplies light to the LCD panel, and a driving circuit that applies driving signals to pixel units of the LCD panel.

Backlight units may be classified into direct-illumination type backlight units and edge-illumination type backlight units according to the methods used of supplying light from a light source to the LCD panel. In the direct-illumination type backlight unit, a plurality of light sources (e.g., fluorescent light bulbs) are provided below the LCD panel to directly supply light to the LCD panel. In the edge-illumination type backlight unit, the light sources are provided in the vicinity of a side or edge portion of the LCD panel, and light is supplied to the LCD panel by being redirected through a light guide plate.

The edge-illumination type backlight unit is conventionally maintained in an always fully turned-on state, in a homogeneous light redistributing state and thus it provides a continuously uniform level of brightness across the entire area of the display panel regardless of brightness of the image pixels being displayed on different parts of the LCD panel or regardless of dark bands that may be caused by presence of a black matrix of the LCD or the like, and thus maximal light energy is always supplied as a uniform continuum towards the LCD even if such full amount of continuously uniformly supplied light energy is not required for producing the currently displayed image, where the latter may be formed of discrete rows or columns of pixels and where the rows and/or columns may be grouped into regions that can be selectively controlled with backlight local dimming techniques in some cases.

SUMMARY

An edge-illumination type backlight unit is structured so that it can support selective backlight local dimming techniques.

More specifically, the locally dimmable and edge-illumination type backlight unit includes a light guiding and redirecting mechanism that has individual light changing parts arranged to correspond to and align with individually dimmable light sources so that individually dimmable light output from the respective sources is substantially bounded for output from a respective light output area.

In an exemplary embodiment, a light guide plate may include a light incident surface, an opposite surface, a top surface, a bottom surface, and optical path changing units. The light incident surface receives light. The opposite surface is provided in opposition to the light incident surface. The top surface connects the light incident surface to the opposite surface, and outputs the light. The bottom surface is provided in opposition to the top surface to connect the light incident surface to the opposite surface. The optical path changing or changing units are aligned along at least the bottom surface of the top surface and the bottom surface at a predetermined repeat interval while protruding in parallel to a reference line perpendicular to the light incident surface.

In one embodiment, the optical path changing units protrude outward from the bottom surface of the guide plate to thereby define waveguides that have polyhedron structures and operate to reflectively change the light. The light guide plate further may include light refractors protruding outward from its light-outputting top surface and corresponding to the optical path changing units of its bottom surface. The light refractors may each have a semi-circular shape.

The optical path changing units may include waveguide structures that protrude outward from both the top and bottom surfaces in correspondence with each other, and which have polyhedron structures for internally reflecting light rays in parallel to a predefined reference line or reference plane. The light guide plate may further include a plurality of prisms provided on the bottom surface in a shape of a positive embossment or a negative embossment.

The prisms may be spaced apart from each other by a first interval in a first region of the bottom surface adjacent to the light incident surface, and spaced apart from each other by a second interval, which is shorter than the first interval, on a second region of the bottom surface adjacent to the opposite surface. The prisms may have a first size in the first region of the bottom surface adjacent to the light incident surface, and have a second size, which is greater than the first size, in the second region of the bottom surface adjacent to the opposite surface.

In the same or another exemplary embodiment, a backlight unit may include a plurality of light sources, a light guide plate, and an optical path changing unit. The light guide plate includes a light incident surface to receive light from the light sources. The optical path changing unit is placed between the light sources and the light incident surface to refract the light in parallel to a reference line perpendicular to the light incident surface.

The optical path changing unit may be integrally formed with the light guide plate, and may include a plurality of lenses protruding outward from the light incident surface.

The lens may protrude outward from the light incident surface, and have a semi-circular surface. The optical path changing unit may be placed between the light sources and the light guide plate. The optical path changing unit may include a plurality of lenses corresponding to the light sources.

The lens may include a first curved surface and a second curved surface. The first curved surface faces the corresponding light source in adjacent to the corresponding light source, and diffuses the light. The second curved surface is placed between the first curved surface and the light incident surface to refract the light in parallel to the reference line.

The first and second curved surfaces may define concave and convex lenses, respectively, and the light sources may be placed at a focal point or length of the second curved surface.

The first curved surface may have a curvature radius different from a curvature radius of the second curved surface, and the curvature radius of the second curved surface may be smaller than the curvature radius of the first curved surface.

The optical path changing unit may include at least one of acryl, polymethylmetacrylate (PMMA), polycarbonate (PC), and polystyrene (PS).

In still another exemplary embodiment, a backlight unit may include a plurality of light sources and a light guide plate. The light guide plate may include a light incident surface to receive light from the light sources. The light guide plate may include first light guide areas and second light guide areas. The first light guide areas may be disposed at a predetermined interval in parallel to a reference line substantially perpendicular to the light incident surface, and have a first refractive index with respect to the light. The second light guide areas may be interposed between the first light guide areas, and have a second refractive index with respect to the light.

The first refractive index may be greater than the second refractive index by about 0.05 or more. The second light guide area may have a size corresponding to about 60% to about 95% relative to a size of the light guide plate.

According to the above, the light guide plate includes the optical path changing unit to refract incident light in parallel to a predetermined reference line or plane. Since light output from each of individually dimmable light sources is substantially bounded to a predetermined output region of the guide plate, brightness of the light in each such output area of the guide plate may be adjusted. In addition, a backlight unit which includes such a locally dimmable and edge-illumination type light guide plate may be used in a display system that adjusts the brightness of backlighting in each of controllable display areas of the display panel to thereby reduce power consumption of the backlight unit when relatively dark image areas are being displayed.

BRIEF DESCRIPTION OF THE DRAWINGS

The above and other aspects of the present disclosure will become more readily apparent by reference to the following detailed description when considered in conjunction with the accompanying drawings wherein.

DETAILED DESCRIPTION

Figure 1:
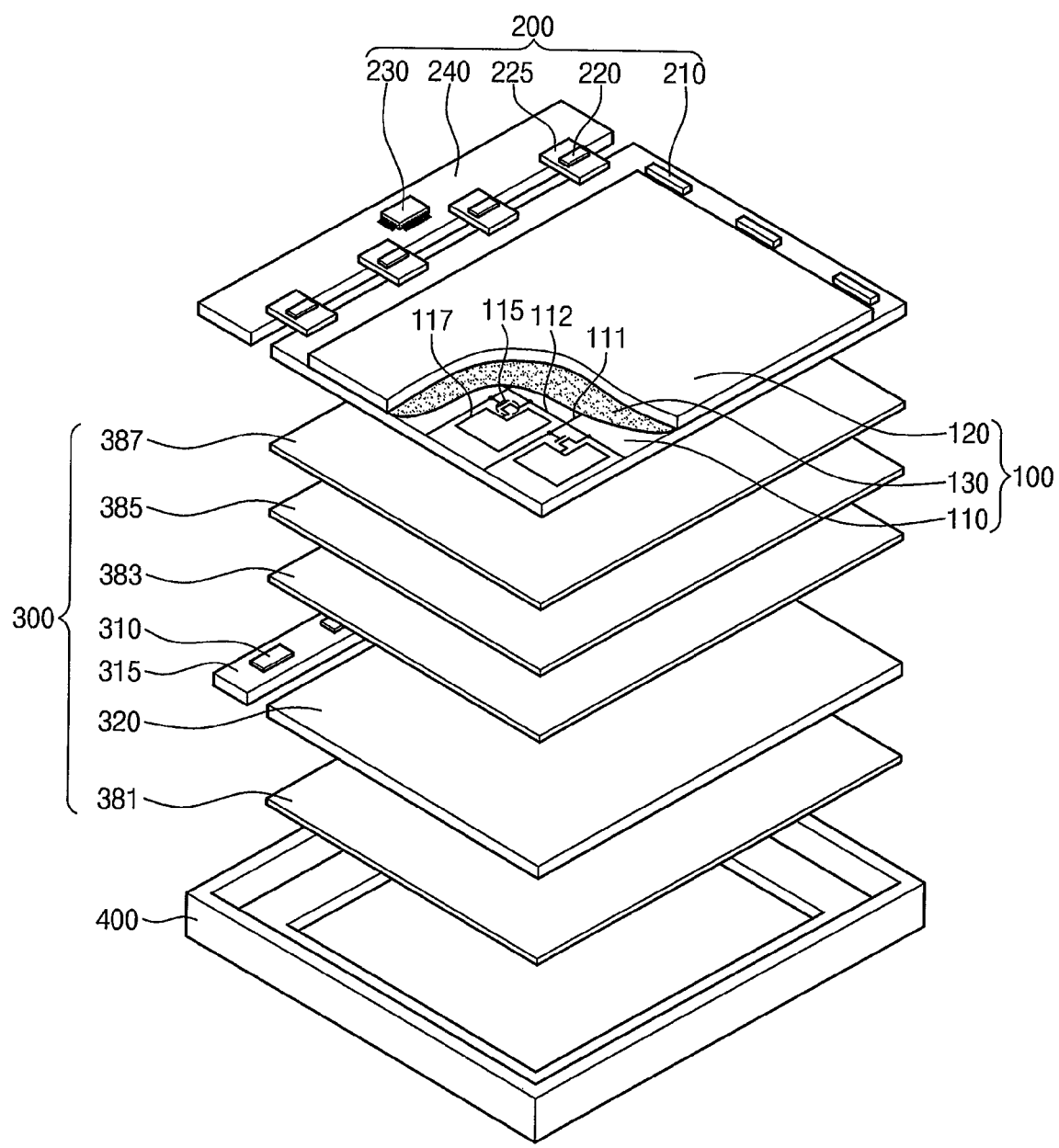
FIG. 1 is an exploded perspective view showing an exemplary first embodiment of a display device according to the present disclosure.

Hereinafter, exemplary embodiments of a light guide plate and a backlight unit having the same will be described with reference to accompanying drawings. It is to be understood that the present disclosure of invention should not be limited to the following specific exemplary embodiments and that after review of this disclosure various changes and modifications can be made by those of ordinary skill in the art while remaining within the spirit and scope of the present disclosure. Meanwhile, elements shown in the drawings can be simplified or magnified for the purpose of clear explanation. In addition, the same reference numerals may be used to designate the same or similar elements throughout the drawings.

FIG. 1 is an exploded perspective view showing a first exemplary embodiment.

Referring to FIG. 1, the illustrated display device includes a display panel 100, a panel driver 200, a backlight unit 300, and a mold frame 400.

The display panel 100 includes a thin film transistors (TFT's) supporting substrate 110, a color filters substrate 120, and liquid crystal layer 130 interposed between the thin film transistor substrate 110 and the color filter substrate 120 to adjust light transmittance.

The thin film transistor substrate 110 includes gate lines 111 and data lines 112 (only an exemplary one shown), which cross each other on the light-passing substrate, which substrate may include glass or plastic. A thin film transistor 115 is connected to its adjacent ones of the gate lines 111 and the data lines 112 to thereby form a pixel unit. In the pixel unit, a pixel electrode 117 is further connected to the thin film transistor 115.

The color filters substrate 120 faces the thin film transistor substrate 110. The color filters substrate 120 includes color filters of different colors (including white as an option, in addition to R, G, B or other three primaries not shown), a black matrix blocking light leakage between pixel units (not shown), and a common electrode (not shown).

The liquid crystal layer 130 is aligned by an alignment layer (not shown) disposed between the color filters substrate 120 and the thin film transistors substrate 110, and driven by an electric field generated between the pixel electrode 117 and the common electrode, thereby adjusting light transmittance.

The panel driver 200 includes a gate driver 210, a data driver 220, a timing controller 230, and a printed circuit board 240 in order to apply various control and drive signals to the display panel 100.

The gate driver 210 is mounted on one side of the display panel 100 to apply gate driving signals to the gate lines 111. The data driver 220 is mounted on a signal transmission film 225 formed with a plurality of interconnections, and electrically connected to the display panel 100 and the printed circuit board 240. The timing controller 230 is mounted on the printed circuit board 240 to apply control signals to the gate driver 210 and the data driver 220. The printed circuit board 240 includes various electronic devices, such as the timing controller 230, to apply various signals to the display panel 100 through the signal transmission film 225. While not explicitly shown, it is to be understood that in one embodiment, the panel driver 200 includes circuitry for supporting selective backlight local dimming. In such a case, some areas of the backlight source (the top surface of plate 320) are caused to output less light than others of the areas and TFT data signals are adjusted to account for such selective dimming of some backlight source areas but perhaps not all backlight source areas.

The backlight unit 300 includes a plurality of spaced apart light sources such as light emitting diodes 310, where the respective light intensity outputs of the respective spaced apart light sources are adjustable to support selective backlight dimming in the case where such a technique is employed. The backlight unit 300 further includes a light source substrate 315 supporting the light sources, a light guide plate 320 that receives light from the spaced apart light sources and redirects that light, a reflective sheet 381, a diffusion sheet 383, a prism sheet 385, and a protective sheet 387 stacked as shown in order to define areas (selectively dimmable areas) that each provide a uniform amount of back lighting to the respective counter-facing areas of the display panel 100.

The light emitting diodes 310 are mounted on the light source substrate 315 and are spaced apart at a predetermined interval to generate a white light supplied to the display panel 100.

The light source substrate 315 on which the light emitting diodes 310 are mounted receives electrical power from a power source exterior to the light emitting diodes 310 and distributes the electrical power to the light emitting diodes 310. As mentioned, in one embodiment, the light emitting diodes 310 are selectively dimmable, individually or as groups, for the purpose of supporting selective backlight dimming.

The light guide plate 320 changes the paths of light rays supplied from the discrete, spaced apart and selectively dimmable light emitting diode units 310 to thereby supply light rays extending along redirected directions to the display panel 100. The light guide plate 320 includes a transparent material such that the sourced light can be transmitted therethrough. For example, the light guide plate 320 includes at least one of acryl, polymethylmetacrylate (PMMA), polycarbonate (PC), and polystyrene (PS). Light enters from at least one side edge of the light guide plate 320 and exits from a top major surface of the light guide plate 320.

The reflective sheet 381 is positioned below the light guide plate 320, and includes a material having a high reflective index with respect to light. For example, the reflective sheet 381 may be formed by coating a reflective material having a high reflective index on a base material. The reflective sheet 381 reflects light, which is emitted downward from the light guide plate 320, toward the light guide plate 320 to reduce light loss in the downward direction. In one embodiment, back edge surface 323 of the light guide plate 320 is beveled to reflect light toward the reflective sheet 381 and therefrom up through diffusion sheet 383 toward the display panel 100.

The diffusion sheet 383 is provided above the light guide plate 320. The diffusion sheet 383 diffuses light exiting from the top of the light guide plate 320 such that the light is uniformly incident onto the display panel 100.

The prism sheet 385 is provided above the diffusion sheet 383 to collect light exiting from the diffusion sheet 383 such that the light is vertically incident onto the display panel 100.

The protective sheet 387 is provided above the prism sheet 385 to protect the prism sheet 385 from external shock.

The mold frame 400 receives the display panel 100 and the backlight unit 300 to protect the display panel 100 and the backlight unit 300 from external shock. To this end, the mold frame 400 includes a material such as plastic.

Hereinafter, an area-by-area dimmable backlight unit 300 according to exemplary embodiments will be described in detail with reference to FIGS. 2A and 2B, 3A to 3C, 4A to 4D, and 5. FIGS. 2A and 2B, 3A to 3C, 4A to 4D, and 5 show some components of the backlight unit 300 for the convenience of explanation. However, the backlight unit 300 according to the present disclosure of invention is not to be limited to the components shown in the drawings.

Figure 2A:
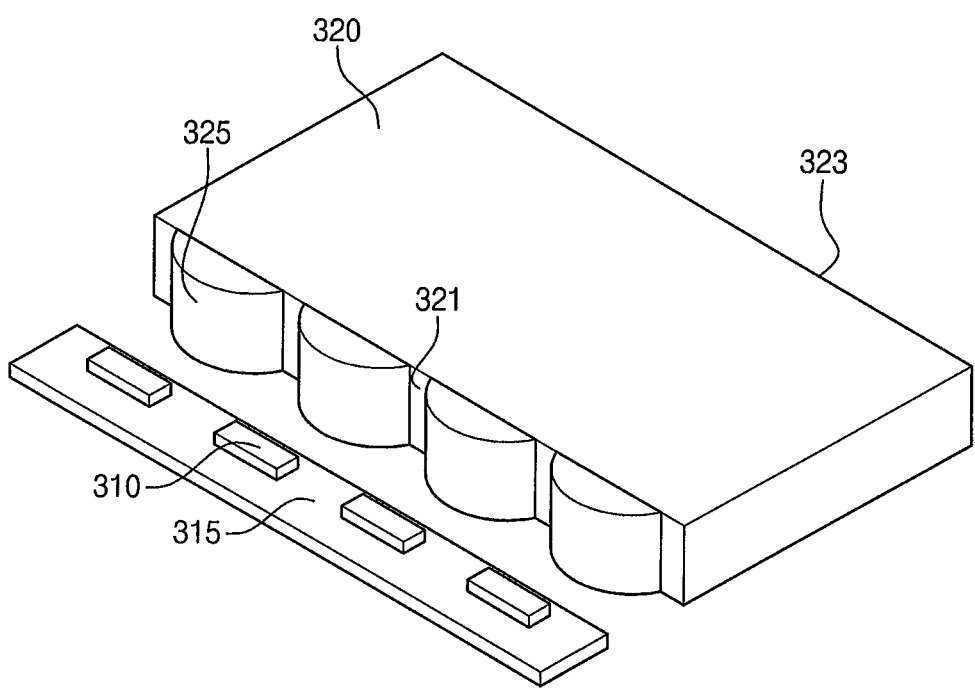
FIGS. 2A and 2B are views showing an exemplary embodiment of a backlight unit according to the present disclosure.
Figure 2B:
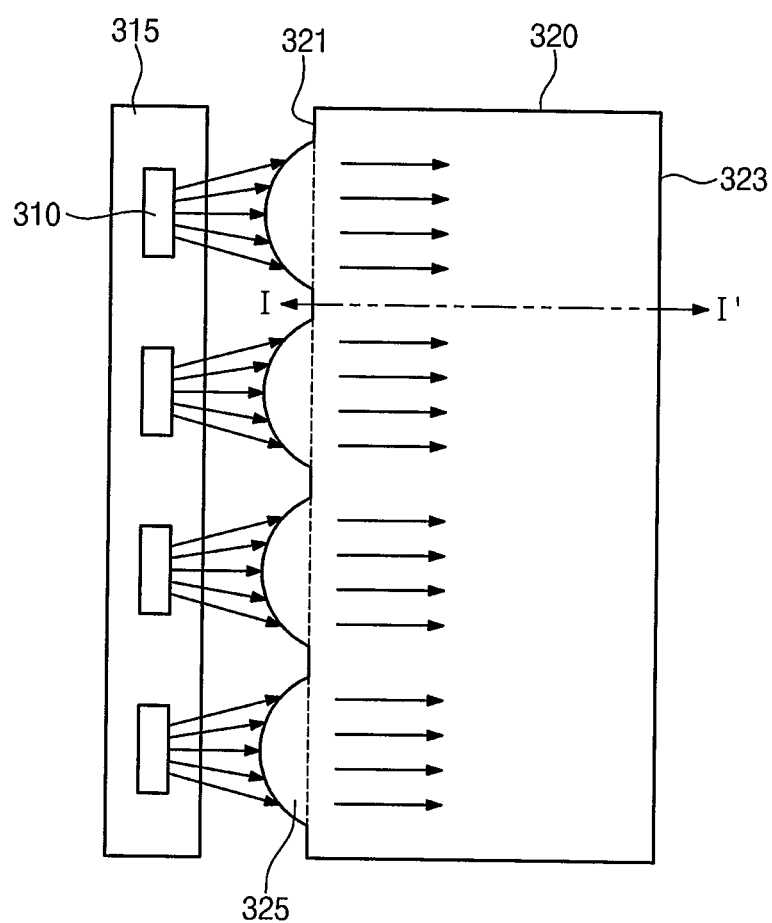

FIGS. 2A and 2B are views showing an exemplary embodiment of the backlight unit 300.

Referring to FIGS. 2A and 2B, the backlight unit 300 includes the light emitting diodes 310 mounted as a linear array of spaced apart and individually dimmable light sources on the light source substrate 315, and the light guide plate 320.

The light emitting diodes 310 are mounted on the light source substrate 315 at a predetermined interval to serve as regularly spaced apart point light sources or regularly spaced apart bar segment light sources. The light emitting diodes 310 supply corresponding rays of light toward the light guide plate 320.

The light guide plate 320 is provided at the side of the light emitting diodes 310, and includes a transparent material such that the light is transmitted into the plate and redirected within the plate 320. The light guide plate 320 may include any one or more of acryl, polymethylmetacrylate (PMMA), polycarbonate (PC), and polystyrene (PS).

The light guide plate 320 includes a light incident surface 321 (e.g., including lens shaped surfaces 325) facing the light emitting diodes 310. The light incident surface 321 is adjacent to the faced light emitting diodes 310. The light guide plate 320 includes an opposite surface 323 provided in opposition to the light incident surface 321. The light incident surface 321 is a side surface of the light guide plate 320 designed to receive the light supplied from the adjacent light emitting diodes 310. The light guide plate 320 includes the lens shaped optical path changing units 325 formed for example integrally on the light incident surface 321.

Each optical path changing unit 325 protrudes outwardly from the light incident surface 321. In detail, the optical path changing unit 325 is formed on the light incident surface 321 corresponding to the adjacent light emitting diode 310. The optical path changing unit 325 of one embodiment has a semi-cylindrical shape. The optical path changing unit 325 refracts the light supplied from the faced light emitting diode 310 (e.g., the topmost diode 310 in FIG. 2B) so the refracted light rays travel substantially in parallel to a reference line I-I' that is perpendicular to the light incident surface 321 and, in the case of the topmost diode 310 in FIG. 2B; substantially between the reference line I-I' and the left side edge of the light guide plate 320 such that dimming of the topmost diode 310 in FIG. 2B will result in corresponding dimming for the corresponding light output area between the reference line I-I' and the left side edge of the light guide plate 320. The left side edge of the light guide plate 320 connects the incidence surface 321 with the opposing surface 323. For example, in one embodiment, the optical path changing unit 325 serves as a convex lens that converts the radially emitting light rays from the light emitting diode 310 into parallel light rays that are restricted, due to their parallelism and aimed direction, to traveling between the reference line I-I' and the left side edge of plate 320. The redirected and restricted light may be refracted or reflected by the opposing surface 323 and/or refracted or reflected by structures (not shown) on the bottom surface of the light guide plate 320 so as to exit to the exterior through the top surface of the light guide plate 320 (top as shown in perspective in FIG. 2A) while still being substantially bound between, for example the reference line I-I' and the left side edge of the light guide plate 320 in the case of light outputted from the selectively dimmable topmost diode 310 in FIG. 2B. However, it is to be noted that each light emitting diode 310 is provided as a point source at a position that corresponds to the center receiving line of the optical path changing unit 325, and thus light output from the light emitting diode 310 is of a radially directed nature associated with point sources.

The optical path changing unit 325 according to exemplary embodiments of the present invention refracts the initially, radially-directed light rays to instead become rays that are parallel to the reference line I-I' (and/or to a reference plane that includes the reference line I-I'). Since the parallel light rays obtained from one of the light emitting diode 310 are substantially bounded in the portion of the light guide plate 320 between the reference line I-I' and the left side edge of the light guide plate 320, the parallel light rays become possible to perform local backlight dimming techniques. When one or more such local dimming methods are employed, the top surface of the light guide plate 320 is partitioned into a plurality of individually dimmable areas where each of the areas can be controlled to have a respective different brightness of backlighting emitted therefrom. Accordingly, the brightness of the backlight unit 300 may be adjusted according to gray scales of the images of the display panel 100. For example, if a top banner portion of the display panel 100 is to show a relatively bright (e.g., white) portion of the image, the corresponding light emitting diode 310 are operated at maximum or other appropriate intensity to thereby provide the top banner portion of the display panel 100 with a predetermined amount of needed maximum brightness. On the contrary, if a lower banner portion of the display panel 100 shows a relatively dark (e.g., near black) portion of the image, the corresponding light emitting diode 310 are operated at well below maximum intensity to thereby provide the lower banner portion of the display panel 100 with a predetermined amount of needed maximum brightness to support the relatively darker set of gray scale values that are to be displayed in the lower banner portion of the display panel 100. Since maximum light output is not being wastefully output for the relatively darker, the lower banner portion of the display panel 100 in this example, the backlight unit 300 to which such a local dimming method is applied may reduce its power consumption as compared to an edge-illuminated backlight unit where selective local dimming is not possible.

The optical path changing unit 325 may include the same material as that of the light guide plate 320 and may be a monolithic integral part of plate 320. In this case, the optical path changing unit 325 may have a refractive index in the range of about 1.5 to about 1.6. The optical path changing units 325 each have a semi-circular shape with a curvature radius corresponding to the refractive index for producing the redirected parallel light rays as shown for example in FIG. 2B.

While the example of FIG. 2B sources light from just one edge and allows for local dimming of horizontally-elongated banner shaped portions of a display, it is within the contemplation of the present disclosure to provide for local dimmings of otherwise shaped areas and/or to source the dimmable light from other edges of the light guide plate. For example, additional and individually dimmable light emitting diodes such as 310 may be provided to supply the light into two or even all four side surfaces of the light guide plate 320. Light supplied from opposed edges may be staggered to form an interlaced pattern if desired. For example, the light emitting diodes 310 may be provided in spaced apart formation corresponding to four side surfaces of the light guide plate 320 with parallelism of emitted light rays being provided for at each region of light insertion into the light guide plate 320. Accordingly, the light guide plate 320 may include four light receiving surfaces such as the light incident surface 321. In addition, the light emitting diodes 310 may be placed at a focal length point relative to the corresponding optical path changing unit 325. The focal length is a distance to refract light incident onto the optical path changing unit 325 in parallel to the reference line I-I'.

Figure 3A:
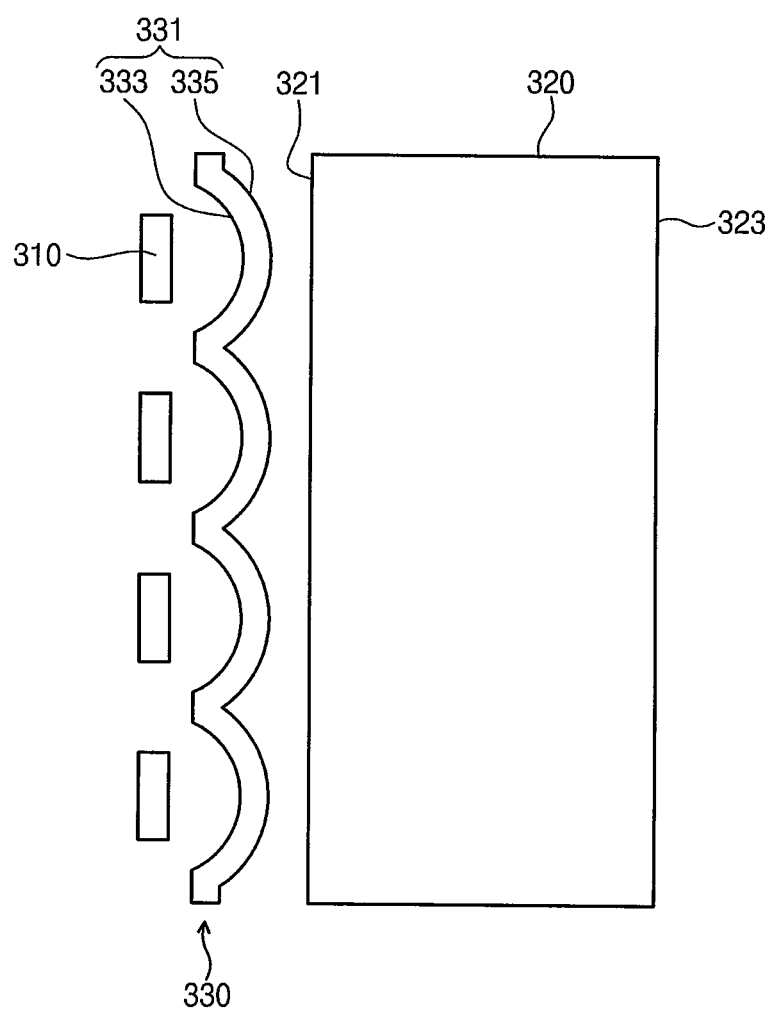
FIGS. 3A to 3C are views showing another exemplary embodiment of a backlight unit.
Figure 3B:
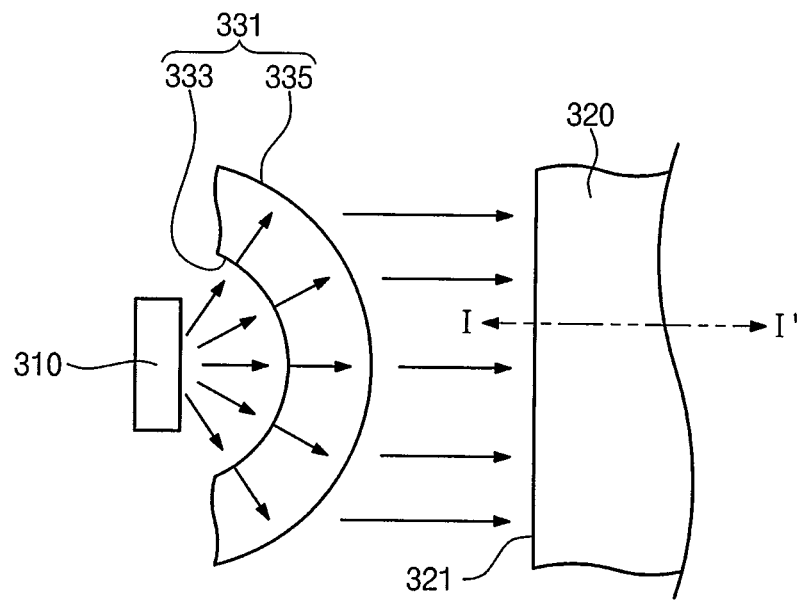
Figure 3C:
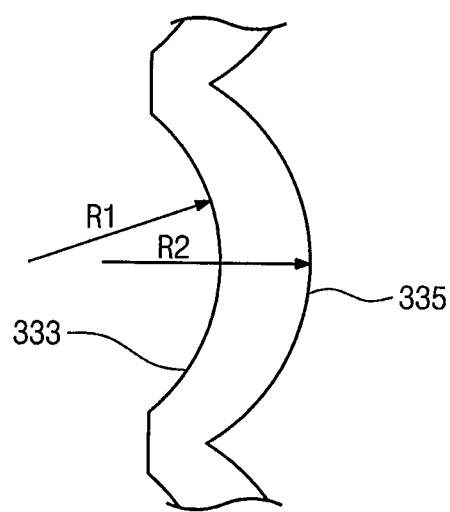

FIGS. 3A to 3C are views showing another exemplary embodiment of a locally dimmable and edge-illuminated backlight unit 300 according to the present disclosure.

Referring to FIGS. 3A to 3C, the backlight unit 300 includes the light emitting diodes 310, the light guide plate 320, and an optical path changing unit 330 that is spaced apart from the light guide plate 320 of these figures.

The light emitting diodes 310 are provided at a predetermined interval to supply light toward the light guide plate 320.

The light guide plate 320 guides light, which is introduced through side surfaces thereof, toward a top surface thereof. The light guide plate 320 includes the light incident surface 321 receiving light. The light incident surface 321 is a side surface of the light guide plate 320 to receive the light supplied from the light emitting diode 310.

The optical path changing unit 330 is placed between the light emitting diodes 310 and the light incident surface 321. The optical path changing unit 330 includes a plurality of lenses 331 corresponding to the light emitting diodes 310. The lenses 331 each includes a first curved surface 333 facing and being more adjacent to the respective light emitting diode 310, and a second curved surface 335 facing the light incident surface 321 and being more adjacent to the light incident surface 321.

As best seen in FIG. 3B, the first curved surface 333 operates as a concave lens and works to spread out or diffuse the radially emanating light rays supplied from the point-source like light emitting diode 310. To this end, the first curved surface 333 has a first curvature radius R1. For example, as mentioned, the first curved surface 333 serves as a concave lens.

The second curved surface 335 operates as a convex lens and works to create parallelism among the spread out light rays supplied through and from the first curved surface 333. The second curved surface 335 is shaped and aimed to cause its output light rays to be parallel to the reference line I-I' where the latter is orthogonal to the light incident surface 321. To this end, the second curved surface 335 has a second curvature radius R2. For example, as mentioned, the second curved surface 335 serves as a convex lens.

In order to refract the light exiting from the second curved surface 335 in parallel to the reference line I-I', the light emitting diodes 310 are each placed so their light emitting portions are disposed at the focal length of the second curved surface 335. The first curvature radius R1 is greater than the second curvature radius R2. This will be described below in more detail with reference to following equation 1.

$$\frac{1}{f} = (n-1)\left(\frac{1}{R1} - \frac{1}{R2}\right) \qquad \text{Equation 1}$$

In Equation 1, f, n, R1, and R2 respectively denote a focal length, a refractive index of the light refracting medium, the first curvature radius, and the second curvature radius, respectively, wherein, n is assumed to be about 1.5.

Since the lenses 333 and 335 both have a concave shape with respect to the light emitting diode 310, both the R1 and R2 have negative values. However, since the second lens 335 serves as a convex lens to refract the light into being parallel to the reference line I-I', the focal length has a positive value. In order to provide for such an outcome, the first curvature radius R1 is greater than the second curvature radius R2.

The optical path changing unit 330 may include any one of acryl, polymethylmetacrylate (PMMA), polycarbonate (PC), and polystyrene (PS). In the optical path changing unit 330, the values of R1 and R2 may be varied depending on refractive indices of the above materials. In addition, the focal length may be varied depending on the refractive indices of the above materials.

Meanwhile, as in the case of FIG. 2B, it is within the contemplation of the disclosure to vary on the basic theme of FIGS. 3A-3C and have the individually dimmable light emitting diodes 310 supplying light to two, three or all four side surfaces of the light guide plate 320. For example, the light emitting diodes 310 may be provided corresponding to four side surfaces of the light guide plate 320. Accordingly, four optical path changing units 330 may be provided between the light emitting diodes 310 and the light guide plate 320.

FIGS. 4A to 4D are views showing another exemplary embodiment of a locally dimmable and edge-illuminated backlight unit 300 according to the present disclosure.

Referring to FIGS. 4A to 4D, the backlight unit 300 includes the light emitting diodes 310 and the light guide plate 320.

The light emitting diodes 310 are provided at a predetermined interval to supply light into the light guide plate 320.

The light guide plate 320 guides light, which is introduced through side surfaces thereof, toward a top surface 342 thereof. The light guide plate 320 includes the light incident surface 321 receiving light, the opposite surface 323 provided in opposition to the light incident surface 321, a bottom surface 341 connecting the light incident surface 321 with the opposite surface 323, and the top surface 342 provided in opposition to the bottom surface 341. In addition, the light guide plate 320 includes optical path changing units 343 protruding outward from at least one of the bottom surface 341 and the top surface 342 and operating to substantially bound light emitted from the respective light source 310 to exit from a corresponding, banner shaped region of top surface 342 of the light guide plate 320.

Figure 4A:
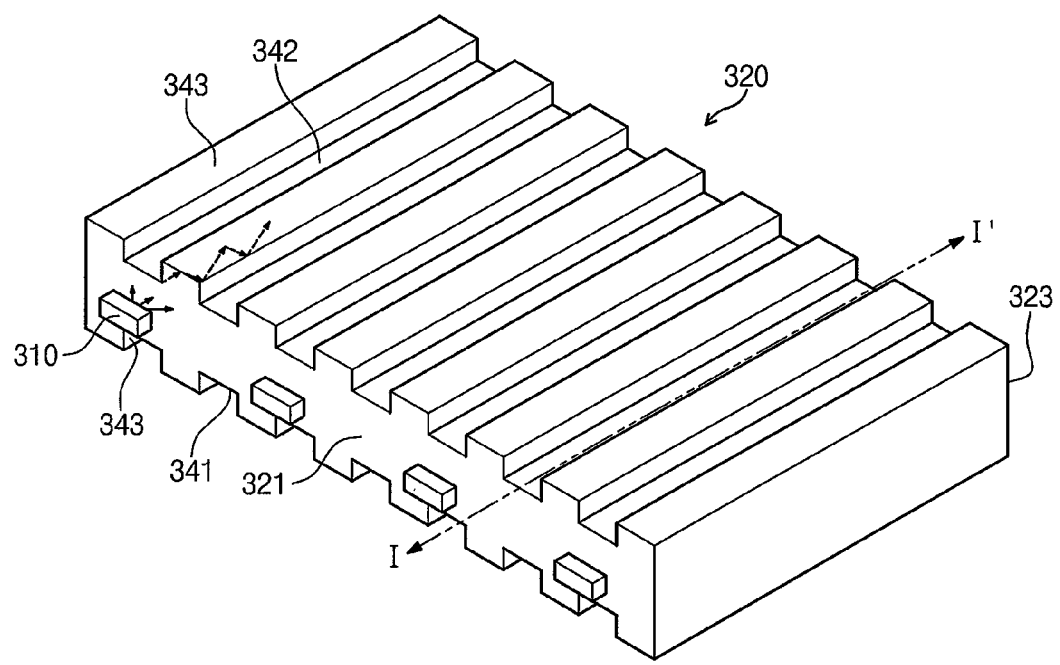
FIGS. 4A to 4D are views showing another exemplary embodiment of a backlight unit.

In detail, as shown in FIG. 4A, in one embodiment, the optical path changing units 343 are formed on both the bottom surface 341 and the top surface 342 in correspondence with each other. The optical path changing units 343 are elongated in parallel to the reference line I-I' perpendicular to the light incident surface 321. The optical path changing units 343 are provided at a predetermined interval corresponding to that of the light emitting diodes 310. For example, the four optical path changing units 343 may each correspond to one of the four illustrated light emitting diode 310 and may serve as light redirecting wave guides.

The optical path changing units 343 have a polygonal shape to reflect light received from the light emitting diodes 310. For example, the optical path changing units 343 protrude from the bottom surface 341 and the top surface 342 in the form of rectangular columns that function as waveguides for changing and guiding light up out of the respective portion of the top surface of the plate 320 of FIG. 4A. Protrusions 343 also function as waveguides for guiding light in a direction parallel to line I-I'. Accordingly, the optical path changing units 343 reflect light therein several times such that light travels in parallel to the reference line I-I' within a predetermined changing area as well as exiting up and out of the top surface 342 of plate 320.

Figure 4B:
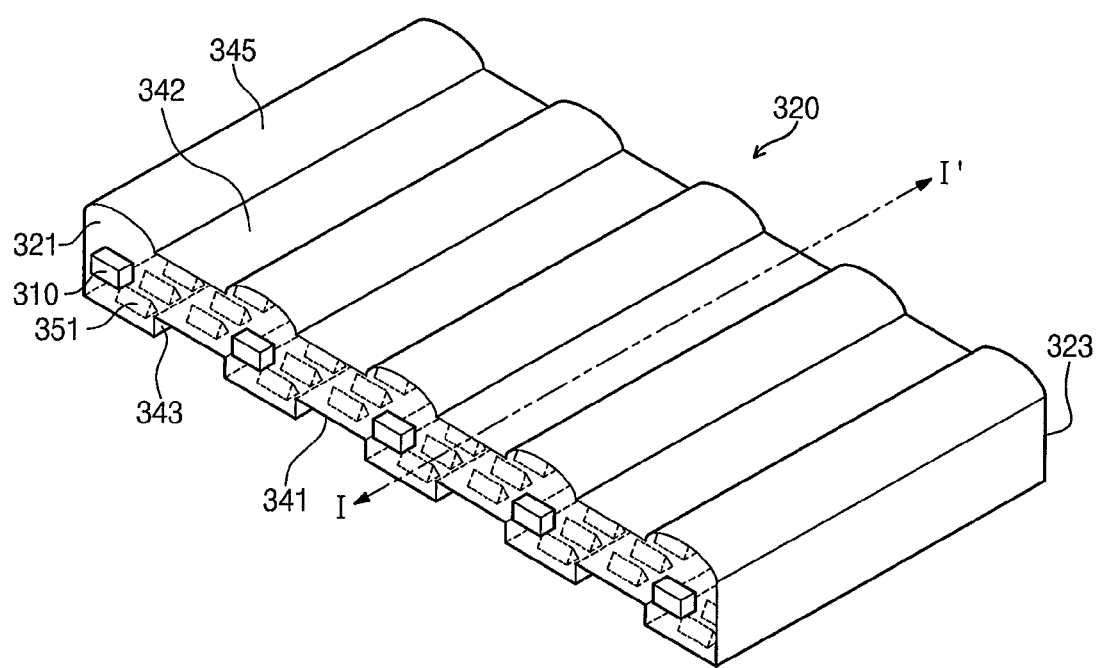
Figure 4C:
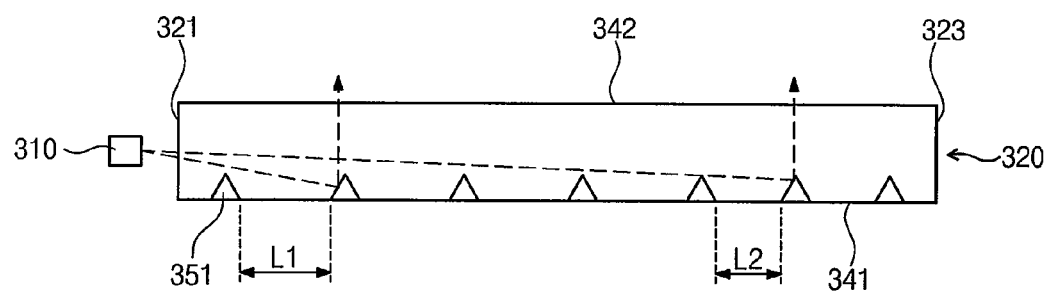
Figure 4D:
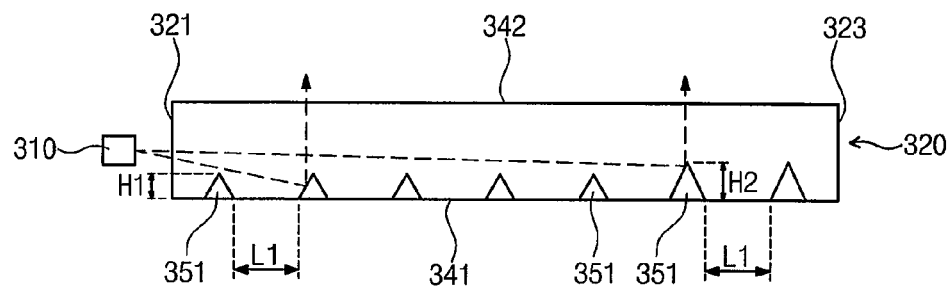

As shown in FIG. 4B, the optical path changing units 343 may be formed only on the bottom surface 341 while light focusing lenses 345 are integrally formed on the top surface. The optical path changing units 343 reflect light introduced through the light incident surface 321 several times within the changing units 343 such that the emitted light travels substantially in parallel to the reference line I-I'. In the present exemplary embodiment, a plurality of light refractors 345 are formed to refract the light as it exits from the top surface 342 so as to provide rays traveling in parallel to the light incident surface 321. The light refractors 345 each have a semi-circular shape corresponding to the optical path changing unit 343.

The light guide plate 320 further includes a plurality of prisms 351 provided on the bottom surface 341 and having a positive embossment shape or a negative embossment shape. For the purpose of explanation, the prism 351 having the positive embossment shape shown in FIGS. 4B to 4D will be representatively described.

In detail, the prisms 351 reflect light introduced through the light incident surface 321 to output the light toward the top surface 342. To this end, the prisms 351 are formed on the bottom surface 341 and the optical path changing units 343 protruding outward from the bottom surface 341. The prisms 351 may be aligned at various intervals depending on a distance from the light incident surface 321. For example, the prisms 351 are spaced apart from each other by a first interval L1 on the bottom surface 341 adjacent to the light incident surface 321. In addition, the prisms 351 are spaced apart from each other by a second interval L2 on the bottom surface 341 adjacent to the opposite surface 323. The first interval L1 may be greater than the second interval L2. Between the light incident and the opposite surfaces, 321 and 323, the separation interval may monotonically change from L1 to L2. The light guide plate 320 can uniformly output the light over the entire portion of the top surface 342 by using the prisms 351 aligned at the first and second intervals L1 and L2 and values therebetween.

In addition, the prisms 351 may have various sizes depending on the distance from the light incident surface 321. In this case, the prisms 351 may be aligned at the first interval L1. For example, the prism 351 may have a first height H1 on the bottom surface 341 adjacent to the light incident surface 321. In addition, the prism 351 may have a second height H2 on the bottom surface 341 adjacent to the opposite surface 323. The second height H2 is greater than the first height H1.

Meanwhile, the prisms 351 may be formed even in the light guide plate 320 shown in FIG. 4A.

Figure 5:
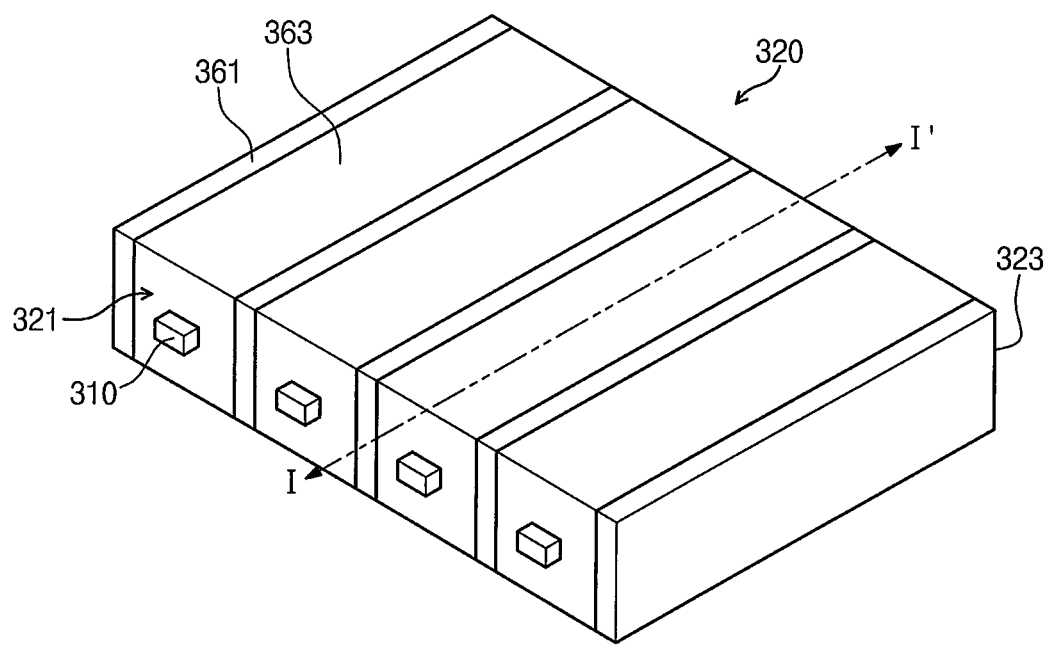
FIG. 5 is a perspective view showing another exemplary embodiment of a backlight unit.

FIG. 5 is a perspective view showing another exemplary embodiment of a locally dimmable and edge-illuminated backlight unit 300 according to the present disclosure.

Referring to FIG. 5, the backlight unit 300 includes the light emitting diodes 310 and the light guide plate 320.

The light emitting diodes 310 are provided at a predetermined interval to supply light to the light guide plate 320.

The light guide plate 320 guides light, which is introduced through a side surface thereof, toward a top surface thereof. The light guide plate 320 includes the light incident surface 321 receiving the light. The light incident surface 321 is a side surface of the light guide plate 320 to receive light supplied from the light emitting diode 310. The light guide plate 320 includes first light guide areas 361 having a first refractive index and second light guide areas 363 having a second refractive index.

The first light guide areas 361 are formed in parallel to the reference line I-I' perpendicular to the light incident surface 321. The first light guide areas 361 are aligned at a predetermined interval in the light guide plate 320.

The second light guide areas 363 are interposed between the first light guide areas 361. For example, the first light guide areas 361 are alternately aligned with the second light guide areas 363. The second light guide areas 363 are aligned corresponding to the light emitting diodes 310. Accordingly, the second light guide areas 363 receive light from the light emitting diodes 310. Each of the second light guide areas 363 has a volume greater than that of each of the first light guide areas 361. Thus, the second light guide areas 363 correspond to about 60% to about 95% relative to the whole top surface area of the light guide plate 320.

The first light guide areas 361 have a refractive index substantially smaller than that of the second light guide areas 363. In other words, the first refractive index is sufficiently smaller than the second refractive index so as to provide for internal reflections and the changing of light emitted from each dimmable light source 310 to its respective output portion 363. In one embodiment, the first and second refractive indices have a value difference of 0.05 or more. The first light guide areas 361 may include one of acryl, polymethylmetacrylate (PMMA), and polystyrene (PS). The second light guide areas 363 may include polycarbonate (PC).

According to the above, the light guide plate includes the optical path changing unit to refract incident light and cause it to emerge substantially as parallel output rays from respective output portion 363. Accordingly, brightness of the light in each local area may be adjusted. In addition, the backlight unit which includes the locally dimmable and edge-illuminated light guide plate has the ability to adjust the brightness of the light in each area, thereby reducing power consumption of the backlight unit when relatively dark image areas are being displayed.

Although the exemplary embodiments in accordance with the present disclosure of invention have been described, it is understood that the present disclosure should not be limited to these exemplary embodiments but various changes and modifications can be made by one ordinary skilled in the art after having read the present disclosure where the changes are within the spirit and scope of the present disclosure.

What is claimed is:

1. A backlight unit comprising:
   a plurality of light sources, the light sources being individually dimmable and including a first light source;
   a light guide plate that comprises a light incident surface to receive light directly or indirectly from the plurality of light sources; and
   a first plurality of optical path changing units integrated with or disposed adjacent to the light guide plate and including a first optical path changing unit, the first optical path changing unit including a curved surface that is convex toward the first light source and no surface that is concave relative to the first light source, the first optical path changing unit being structured to substantially refract light output from the first light source for providing refracted light,
   wherein each light source among the light sources is placed at a focal length point at a distance relative to a corresponding optical path changing unit among the optical path changing units for the corresponding optical path changing unit to refract light incident onto the corresponding optical path changing unit into parallel light rays.

2. The backlight unit of claim 1, wherein the first optical path changing unit is integrally formed with the light guide plate and comprises a lens protruding outward from the light incident surface toward the first light source.

3. The backlight unit of claim 2, wherein the lens has a semi-circular surface.

4. The backlight unit of claim 1, wherein the optical path changing units are placed between the light sources and the light guide plate.

5. The backlight unit of claim 4, wherein the first optical path changing unit comprises a lens corresponding to the first light source.

6. The backlight unit of claim 1, wherein the first optical path changing unit includes a partial-cylindrical structure, the partial-cylindrical structure including a flat side connected to the light incident surface and a curved side facing the first light source.

7. The backlight unit of claim 1, wherein the first optical path changing unit includes a partial-circular top surface and a partial-circular bottom surface, the partial-circular bottom surface being connected to the partial-circular top surface through the curved surface.

8. The backlight unit of claim 1, wherein the first optical path changing unit includes a convex lens for refracting light rays emitted by the first light source into parallel light rays.

9. The backlight unit of claim 1, wherein the optical path changing units and the light guide plate include a same material.

10. The backlight unit of claim 1, wherein the first optical path changing unit has a refractive index in a range of about 1.5 to about 1.6.

11. The backlight unit of claim 1, wherein the first light source is spaced apart from the optical path changing units.

12. The backlight unit of claim 1, wherein the first light source is disposed outside the optical path changing units.

13. The backlight unit of claim 1, further comprising:
   a second plurality of light sources corresponding to a second light incident surface of the light guide plate, the second plurality of light sources including a second light source; and
   a second plurality of optical path changing units disposed between the second light source and the second light incident surface of the light guide plate,
   wherein the light guide plate is disposed between the first plurality of optical path changing units and the second plurality of optical path changing units.

14. The backlight unit of claim 13, wherein the second plurality of optical path changing units refract light emitted by the second light source to provide refracted light that is parallel to the refracted light provided by the first optical path changing unit.

15. The backlight unit of claim 13 further comprising:
   a third plurality of light sources corresponding to a third light incident surface of the light guide plate, the third plurality of light sources including a third light source; and
   a third plurality of optical path changing units disposed between the third light source and the third light incident surface of the light guide plate.

16. The backlight unit of claim 15 further comprising:
   a fourth plurality of light sources corresponding to a fourth light incident surface of the light guide plate, the fourth plurality of light sources including a fourth light source; and
   a fourth plurality of optical path changing units disposed between the fourth light source and the fourth light incident surface of the light guide plate.

17. The backlight unit of claim 1, wherein the refracted light includes a light ray that is perpendicular to the light incident surface.

* * * * *